United States Patent
Devonport et al.

(10) Patent No.: US 10,590,302 B2
(45) Date of Patent: Mar. 17, 2020

(54) HIGH SOLIDS, LOW VISCOSITY URETHANE-LINKAGE CONTAINING LATEX AND METHOD OF PRODUCTION THEREOF

(71) Applicant: Arkema Inc., King of Prussia, PA (US)

(72) Inventors: Wayne Devonport, Apex, NC (US); Wu Wenjun, Cary, NC (US); Kyu-Jun Kim, Cary, NC (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 15/319,433

(22) PCT Filed: Jun. 12, 2015

(86) PCT No.: PCT/US2015/035450
§ 371 (c)(1),
(2) Date: Dec. 16, 2016

(87) PCT Pub. No.: WO2015/195466
PCT Pub. Date: Dec. 23, 2015

(65) Prior Publication Data
US 2017/0130093 A1     May 11, 2017

Related U.S. Application Data

(60) Provisional application No. 62/013,025, filed on Jun. 17, 2014.

(51) Int. Cl.
| C08G 18/62 | (2006.01) |
| C09D 175/04 | (2006.01) |
| C08G 18/75 | (2006.01) |
| C08G 18/67 | (2006.01) |

(52) U.S. Cl.
CPC ........... *C09D 175/04* (2013.01); *C08G 18/62* (2013.01); *C08G 18/6254* (2013.01); *C08G 18/672* (2013.01); *C08G 18/6755* (2013.01); *C08G 18/755* (2013.01); *C08G 18/758* (2013.01)

(58) Field of Classification Search
CPC .......................... C09D 175/04; C08G 18/672; C08G 18/6755; C08G 18/755; C08G 18/758
See application file for complete search history.

(56) References Cited

U.S. PATENT DOCUMENTS

| 4,070,323 | A | * | 1/1978 | Vanderhoff | ............. | C08F 20/36 |
| | | | | | | 428/423.1 |
| 5,051,464 | A | | 9/1991 | Johnson et al. | | |
| 5,071,904 | A | * | 12/1991 | Martin | ..................... | B05D 7/16 |
| | | | | | | 524/458 |
| 5,541,251 | A | * | 7/1996 | Bontinck | ........... | C09D 133/062 |
| | | | | | | 524/501 |
| 5,552,477 | A | | 9/1996 | Dhein et al. | | |
| 6,153,690 | A | | 11/2000 | Larson et al. | | |
| 2013/0289159 | A1 | | 10/2013 | Ouzineb et al. | | |
| 2017/0174797 | A1 | | 6/2017 | Kim | | |

FOREIGN PATENT DOCUMENTS

| CN | 102703015 | 5/2012 |
| CN | 103360563 | 10/2013 |
| EP | 0 610 246 B1 | 7/2004 |
| EP | 1 093 478 B1 | 12/2004 |
| WO | WO 2015/077677 A1 | 5/2015 |

OTHER PUBLICATIONS

Keddie, J.L., et al.; Fundamentals of Latex Film Formation: Processes and Properties, 2010, p. 1.*
Chern, C.S.; Principles and Applications of Emulsion Polymerization, 2008, p. 1-22.*
A. Lopez, E. Degrandi, E. Canetta, J. L. Keddie, C. Creton and J. M. Asua; "Simultaneous free radical and addition miniemulsion polyerization: Effect of the diol on the microstructure of polyurethane-acrylic pressure-sensitive adhesives"; http://dx.doi.org/10.1016/j.polymer.2011.04.053 pp. 1-6.

* cited by examiner

*Primary Examiner* — Robert S Jones
(74) *Attorney, Agent, or Firm* — Lynn B. Morreale

(57) ABSTRACT

A latex comprising a urethane linkage and having a high solids content and a low viscosity is described herein. Also described is a process for making the urethane linkage-containing latex wherein urethane linkage formation and emulsion polymerization take place in the same processing step.

17 Claims, 3 Drawing Sheets

HIGH SOLIDS, LOW VISCOSITY URETHANE-LINKAGE CONTAINING LATEX AND METHOD OF PRODUCTION THEREOF

CROSS-REFERENCE TO RELATED APPLICATIONS

This application is a national stage application under 35 U.S.C. § 371 of PCT/US2015/035450 filed Jun. 12, 2015, which claims benefit to U.S. patent application Ser. No. 62/013,025, filed Jun. 17, 2014.

FIELD OF THE INVENTION

High solids, low viscosity urethane-linkage containing latex and methods for making the same are described herein.

BACKGROUND OF THE INVENTION

Latexes are widely used in the coatings industry because of their excellent dry characteristics, low VOCs and the ease of application to various substrates. These qualities are important for architectural and industrial applications. Latex properties can be improved by the addition of a urethane linkage into the latex. For example, chemical resistance, hardness, toughness, and dirt pick-up resistance can be improved by the addition of a urethane linkage to latex.

U.S. Pat. No. 6,153,690 describes a method for forming a latex comprising a urethane linkage by first forming a latex comprising an isocyanate reactive monomer by emulsion polymerization and then introducing an isocyanate to the previously formed latex in order to form a urethane linkage between the isocyanate reactive monomer and the isocyanate. In U.S. Pat. No. 6,153,690, hydrophobic isocyanate is present as a relatively large, unstable oil droplet in aqueous phase without surfactant.

There continues to be a need for urethane linkage-containing latex having improved properties. Exemplary desired improved properties include higher solids content, higher solids content in combination with lower viscosity, and higher solids content in combination with low coagulum content.

A latex with high solids content produces a coating that is more desirable from a performance standpoint. A coating with a high solids content is more efficient and economical because it is possible to achieve a desired coating thickness on a substrate with less coating (i.e., fewer layers of a coating with a high solids content are needed to achieve the desired coating thickness). However, during the polymerization, the presence of unstable oil droplet as in U.S. Pat. No. 6,153,690 results in the formation of high levels of coagulum which has to be removed as waste material. As a result, solids content is reduced accordingly due to the loss of usable polymer content in the emulsion product.

Further, higher solids content and low viscosity generally are desirable for greater ease of manufacture and cheaper transportation costs for the latex polymer. For example, a higher solids content provides more flexibility for coating formulators. A higher solids content also allows less water to be shipped to coating formulators.

In addition, an improved process that produces more usable product rather than production waste is desirable. Coagulum is detrimental in latex production processes because it accumulates in the processing equipment and is discarded as waste. Once a process hindering amount of coagulum accumulates in the processing equipment, the equipment is cleaned to remove the coagulum. The cleaning process is costly because of the cost of cleaning and also because of processing downtime associated with cleaning. Further, coagulum is considered to be production waste that is discarded.

There is a need for a process that produces urethane-containing latexes having relatively higher solids content, relatively lower viscosity, and that produces more usable product and less coagulum.

SUMMARY OF THE INVENTION

Exemplary embodiments of the urethane-containing latexes of the present invention have high solids content and low viscosity. Further, exemplary embodiments of the method for making the urethane-containing latexes of the present invention produce more usable product and less coagulum.

In accordance with a first aspect of the present invention, a latex comprises a urethane linkage, wherein the solids content of the latex is greater than or equal to 47% and the viscosity is less than 3000 centipoise. In a feature of the first aspect the solids content of the latex is greater than or equal to 50%. In a further feature, the solids content of the latex is between about 47% and about 65%. In yet a further feature, the coagulum content is less than 2%. In another feature of the aspect, the viscosity is less than 2500 centipoise. In an additional feature, the viscosity is less than or equal to 2000 centipoise.

In a further feature of this aspect, the particle size is less than or equal to 500 nm. The particle size may be less than or equal to 400 nm. Further, the particle size may be between about 50 and about 500 nm. In another feature of this aspect, the viscosity is less than 2500 centipoise and the particle size is less than or equal to 400 nm.

In accordance with a second aspect of the present invention, a method for producing a latex containing a urethane linkage comprises polymerizing an isocyanate and a monomer mixture comprising an isocyanate reactive monomer and at least one additional monomer by emulsion polymerization to produce the latex. In a feature of this aspect, the monomer mixture and the isocyanate are combined prior to polymerization. In another feature, polymerization takes place in a reactor and the method further comprises introducing a catalyst to the reactor. With regard to this feature, the catalyst is selected from the group consisting of an oxidizer and a reducer. With further regard to this feature, the method further comprises introducing an amine to the reactor.

In an additional feature of the aspect, the method further comprises adding water and a surfactant to the monomer mixture.

In another feature, the isocyanate comprises a multifunctional isocyanate. With regard to this feature, the isocyanate is selected from the group consisting of di-cyclohexylmethane-4,4'-diisocyante, isophorone diisocyanate, α,α-dimethy meta isopropenyl benzyl isocyanate, xylene diisocyanate, cyclohexane diisocyanate, hexamethylene dissocyante, or oligomeric hexamethylene diisocyanate.

In a further feature, the isocyanate reactive monomer and/or the at least one additional monomer comprise(s) one or more of an alkyl (meth) acrylate monomer, vinyl monomer, styrene, alkyl substituted styrene, or a monoethylenically unsatured carboxylic acid monomer. With regard to this feature, the isocyanate reactive monomer is selected from the group consisting of hydroxyl containing alkyl (meth) acrylate monomer, hydroxyl containing vinyl monomer, hydroxyl containing allyl monomer, acetoacetoxy containing alkyl (meth) acrylate, and acetoacetoxy containing allyl monomer.

In accordance with other aspects of the invention, the latex may be used in a coating, paint, ink or adhesive. Additionally, the latex may be used in coatings, paint, ink, or adhesives applied to interior and exterior surfaces, wherein the surfaces are selected from the group consisting of metal, asphalt, concrete, stone, ceramic, wood, plastic, polymer, and combination thereof. Further, the latex may be used in coatings, paint, ink, or adhesives applied to rail cars, agricultural machinery, automobile parts, log cabins or decks. Still further, the latex may be used for automotive, industrial, construction and residential housing applications.

DETAILED DESCRIPTION

Figure 1:
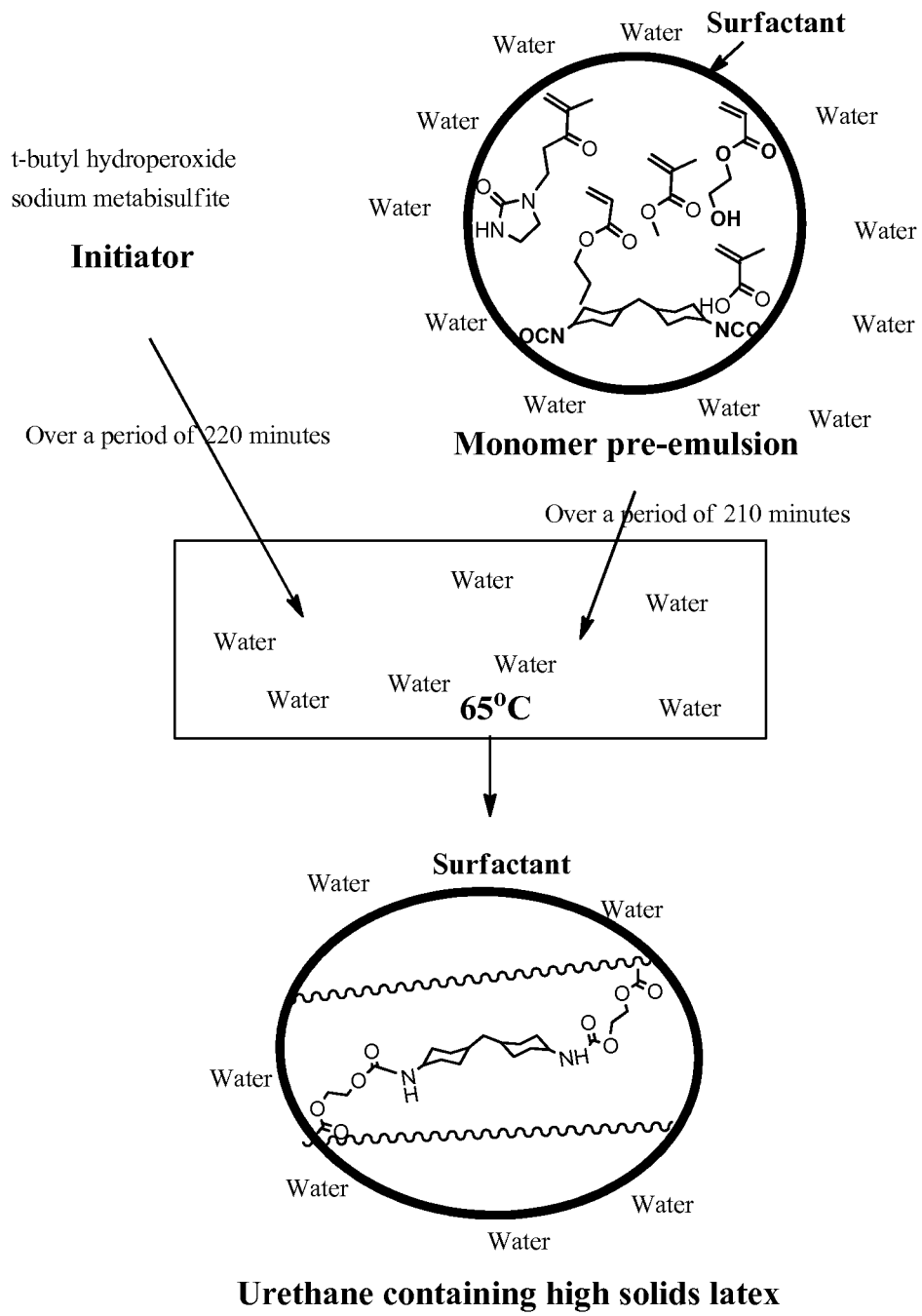
FIG. 1 is a schematic representation of an exemplary process of the invention as described herein for making a urethane linkage-containing latex.

A latex is a stable dispersion or emulsion of polymer microparticles in an aqueous medium. The terms "latex" and "emulsion" are used interchangeably herein.

A latex comprising a urethane linkage is described herein. The latex has a high solids content and a low viscosity. For example, the latex may have a solids content of greater than or equal to about 45% solids. For example, the solids content may be about 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, or 70%, based on total weight of latex. With regard to viscosity, the latex may have a viscosity of 3000 centipoise or less, more preferably 2500 centipoise or less, and most preferably 2000 centipoise or less. For example, the latex may have a viscosity of 3000 centipoise, 2500 centipoise, 2000 centipoise, 1500 centipoise, 1400 centipoise, 1300 centipoise, 1200 centipoise, or 1100 centipoise, as determined using ASTM test method D2196. In this test method, Brookfield viscometer is employed to measure the viscosity at 25° C. with a spindle speed of 5 to 60 rpm.

Additionally, the latex particles are relatively small. For example, the particle size may be less than or equal to 400 nm, more preferably the particle size may be less than or equal to 250 nm. For example, the particle size may be between about 50 nm and 400 nm, as determined using a dynamic light scattering instrument such as Microtrac Nano-Trac 150 particle size analyzer.

Additionally, the latex having a urethane linkage (or urethane linkage-containing latex) may aid in improving the performance of coatings prepared therewith. For example, coatings prepared with the described latex may have improved chemical resistance, hardness, toughness, and/or dirt pick-up resistance. For example, a coating prepared with the described latex may have higher hardness compared with the latex without urethane linkage. As one of ordinary skill in the art would understand, industry recognized methods are available for measuring hardness. For example, hardness may be measured using a König pendulum hardness tester.

Additionally, a method for producing a latex comprising a urethane linkage is described herein. In the method described herein, the urethane linkage may be incorporated into the latex during the polymerization process. For example, the latex may be produced by polymerizing a monomer mixture by emulsion polymerization in the presence of an isocyanate. The monomer mixture may comprise an isocyanate reactive monomer and at least one additional monomer. The isocyanate reactive monomer and the isocyanate may react during polymerization to form the urethane linkage in the latex. As one of ordinary skill in the art will understand, the polymerization process takes place in a reactor. In the described method, isocyanate is added to the reactor during the polymerization process rather than after the polymerization process. In the process, the isocyanate may be added to the monomer mixture prior to polymerization. For example, a monomer pre-emulsion may be formed by combining and agitating an isocyanate, an isocyanate reactive monomer, and at least one additional monomer. The monomer pre-emulsion may then undergo the polymerization process. Alternatively, the isocyanate may be added to the polymerization reactor separately from the monomer mixture. For example, isocyanate and monomer mixture may be added separately to the reactor during polymerization. In this instance, isocyanate may be added to the polymerization reactor simultaneously with the monomer mixture.

The isocyanate may comprise a multi-functional isocyanate. For example, the isocyanate may comprise di-cyclohexylmethane-4,4'-diisocyante, α,α-dimethy meta isopropenyl benzyl isocyanate, isophorone diisocyanate, xylene diisocyanate, cyclohexane diisocyanate, hexamethylene dissocyante, or oligomeric hexamethylene diisocyanate. The isocyanate may be employed in amounts to achieve the desired hardness, chemical resistance and dirt-pick up resistance. Exemplary amounts of isocyanate may include a range of from about 1 to about 20 weight %, preferably 2 to 10 weight % based on polymer solids of the latex.

A monomer (including an isocyanate reactive monomer and/or an at least one additional monomer) for use in the described method may comprise one or more of an alkyl (meth) acrylate monomer, a vinyl ester of a linear or branched carboxylic acid, styrene or a styrene derivative, a hydroxyl-substituted alkyl ester of (meth) acrylic acid, a wet adhesion monomer or combination thereof, a carbonyl containing monomer, or an ionic monomer. An isocyanate reactive monomer may be employed in amounts to achieve the desired hardness, chemical resistance and dirt-pick up resistance. Exemplary amounts of an isocyanate reactive monomer may include a range of from about 1 to about 35% based on total weight of polymer solids. At least one additional monomer may also be employed in the latex. Exemplary amounts of the at least one additional monomer may include a range of from about 65 to about 99% on total weight of polymer solids.

Exemplary isocyanate reactive monomers may include, but are not limited to, 2-acetoacetoxyethyl (meth)acrylate, 3-acetoacetoxypropyl (meth)acrylate, 4-acetoacetoxybutyl (meth)acrylate, 2-cyanoacetoxyethyl (meth)acrylate, 3-cyanoacetoxypropyl (meth)acrylate, 4-cyanoacetoxybutyl (meth)acrylate, N-(2-acetoacetoxyethyl) (meth)acrylamide, allyl acetoacetate, 2,3-di(acetoacetoxy)propyl (meth)acrylate, vinyl acetoacetate, 2-hydroxyethyl(meth)acrylate, 2- and 3-hydroxypropyl(meth)acrylate, and 4-hydroxybutyl (meth)acrylate; hydroxy-substituted vinyl esters and hydroxy-substituted vinyl ethers. Preferred monomers are 2-acetoacetoxyethyl (meth)acrylate, 3-acetoacetoxypropyl (meth)acrylate, 4-acetoacetoxybutyl (meth)acrylate, hydroxyethyl (meth)acrylate, 2- and 3-hydroxypropyl(meth) acrylate, and 4-hydroxybutyl (meth)acrylate. Most preferred monomers are 2-acetoacetoxyethyl methacrylate, hydroxyethyl (meth)acrylate, and 2- and 3-hydroxypropyl(meth) acrylate.

Exemplary additional monomers may include ethylenically unsaturated monomers such as, for example, vinyl- and (meth)acrylic-containing monomers such as, for example, the alkyl esters (for example, the C1-C18 alkyl esters, where the alkyl group is linear or branched) of acrylic and methacrylic acid such as, for example, methyl (meth)acrylate, ethyl (meth)acrylate, n-propyl (meth)acrylate, isopropyl (meth)acrylate, n-butyl (meth)acrylate, isobutyl (meth)acrylate, pentyl (meth)acrylate, 2-ethylhexyl (meth)acrylate, decyl (meth)acrylate, dodecyl (meth)acrylate, and stearyl (meth)acrylate. Further exemplary additional monomers may include vinyl esters of linear and branched carboxylic acids having 1 to 25 carbon atoms, preferably 2 to 20 carbon atoms, such as, for example, vinyl acetate, vinyl propionate, vinyl butyrate, vinyl valerate, vinyl 2-ethylhexylacrylate, vinyl isononanoate, vinyl laurate, vinyl stearate, vinyl versatate. Additional exemplary monomers may include styrene and styrene derivatives, such as, for example, alpha-methylstyrene, 2-chlorostyrene, 4-chlorostyrene, 2,5-dichlorostyrene and 4-methoxystyrene. Preferred monomers are methyl (meth)acrylate, ethyl (meth)acrylate, n-propyl (meth)acrylate, isopropyl (meth)acrylate, n-butyl (meth)acrylate, isobutyl (meth)acrylate, pentyl (meth)acrylate, 2-ethylhexyl (meth)acrylate, alpha-methylstyrene, and styrene. Most preferred monomers are methyl methacrylate, n-butyl acrylate, isobutyl methacrylate, 2-ethyl hexyl acrylate, and styrene.

Additional exemplary monomers may include a wet adhesion monomer or a combination of wet adhesion monomers. These types of monomers are well known in the art and include, for example, polymerizable amino-, urea- and ureido-functionalized ethylenically unsaturated monomers such as aminoethyl acrylate and methacrylate, dimethylaminopropyl acrylate and methacrylate, 3-dimethylamino-2,2-dimethylpropyl-1-acrylate and methacrylate, 2-N-morpholinoethyl acrylate and methacrylate, 2-N-piperidinoethyl acrylate and methacrylate, N-(3-dimethylaminopropyl) acrylamide and methacrylamide, N-(3-dimethylamino-2, 2-dimethylpropyl) acrylamide and methacrylamide, N-dimethylaminomethyl acrylamide and methacrylamide, N-dimethylaminomethyl acrylamide and methacrylamide, N-(4-morpholino-methyl) acrylamide and methacrylamide, vinylimidazole, vinylpyrrolidone, N-(2-methacryloyloxyethyl) ethylene urea, N-(2-methacryloxyacetamidoethyl)-N, N'-ethyleneurea, allylalkyl ethylene urea, N-methacrylamidomethyl urea, N-methacryoyl urea, N-[3-(1,3-diazacyclohexan)-2-on-propyl] methyacrylamide, 2-(1-imidazolyl) ethyl methacrylate, 2-(1-imidazolidin-2-on) ethylmethacrylate, N-(methacrylamido)ethyl ethylene urea (Sipomer® WAM II, Rhodia) and allyl ureido wet adhesion monomer (Sipomer® WAM, Rhodia). Additional exemplary monomers may include (meth)acrylonitrile; cycloalkyl (meth)acrylates such as cyclohexyl(meth)acrylate; aryl and alkaryl esters of (meth)acrylic acid such as phenyl (meth) acrylate.

Additional exemplary monomers may include phosphorus containing monomers and sulfur containing monomers. Examples of phosphorus containing monomers include, but are not limited to, 2-phosphoethyl(meth)acrylate, 2-phosphopropyl(meth)acrylate, 3-phosphopropyl(meth)acrylate, and 3-phospho-2-hydroxypropyl(meth)acrylate, Sipomer™ PAM-100 and Sipomer™ PAM-200 and Sipomer™ PAM-300, vinyl phosphonic acid, allyl phosphonic acid, 2-acrylamido-2-methylpropanephosphonic acid, alpha.-phosphonostyrene, 2-methylacrylamido-2-methylpropanephosphonic acid, (hydroxy) phosphinylmethyl methacrylate. Examples of sulfur containing monomer include, but not limited to, 2-acrylamido-2-methyl-1-propanesulfonic acid, sulfoethyl (meth) acrylate, and vinyl sulfonic acid.

Further exemplary monomers may include ionic monomers such as, for example, alpha, beta-ethylenically unsaturated C3-C8 monocarboxylic and C4-C8 dicarboxylic acids, including the anhydrides thereof, and the C4-C8 alkyl half-esters of the alpha, beta-ethylenically unsaturated C4-C8 dicarboxylic acids. Further, exemplary ionic monomers include acrylamido methylpropane sulfonic acid, styrene sulfonate, sodium vinyl sulfonate, acrylic acid and methacrylic acid, and the C4-C8 alkyl half esters of maleic acid, maleic anhydride, fumaric acid, and itaconic acid.

In addition to the isocyanate, the isocyanate reactive monomer, and the at least one additional monomer, a surfactant or emulsifying agent may be present in the reactor during polymerization. Surfactant may be introduced to the monomer mixture prior to the monomer mixture being introduced to the reactor. Surfactant may be introduced to the reactor separately from the monomer mixture. Further, surfactant may be introduced to the monomer mixture prior to the monomer mixture being added to the reactor and may be introduced additionally to the reactor separately from the monomer mixture.

Suitable surfactants or emulsifying agents may include anionic, cationic, and nonionic emulsifiers customarily used in emulsion polymerization, including mixtures of different emulsifiers. For example, at least one anionic emulsifier in combination with one or more nonionic emulsifiers may be used. Representative anionic emulsifiers may include the alkyl aryl sulfonates, alkali metal alkyl sulfates, the sulfonated alkyl esters, and fatty acid soaps. Specific examples may include sodium dodecylbenzene sulfonate, sodium butylnaphthalene sulfonate, sodium lauryl sulfate, disodium dodecyl diphenyl ether disulfonate, N-octadecyl disodium sulfosuccinate and dioctyl sodium sulfosuccinate. The emulsifying agents may be employed in amounts to achieve adequate emulsification.

Further, a catalyst may be added to the reactor prior to or during emulsion polymerization. The catalyst may be used to initiate free radical polymerization. Suitable catalysts include thermal initiators and redox initiator systems comprising an oxidizing agent and a reducing agent. Suitable catalysts include catalysts known to promote emulsion polymerization and include water-soluble oxidizing agents, such as, for example, organic peroxides (for example, t-butyl hydroperoxide, and cumene hydroperoxide), inorganic oxidizing agents (for example, hydrogen peroxide, potassium persulfate, sodium persulfate, and ammonium persulfate) and those catalysts that are activated in the water phase by a water-soluble reducing agent. Catalysts may be employed in a catalytic amount sufficient to cause polymerization. A catalytic amount may range from about 0.01% to about 5% by weight based upon the total monomers to be polymerized. As potential alternatives to heat or catalytic compounds to activate the polymerization, other free radical producing means, such as exposure to activating radiation, may be employed.

It is also contemplated that a latex containing a urethane linkage as described herein may be blended with at least one additional latex that does not contain a urethane linkage. Thus, the blend would comprise a urethane linkage-containing latex and at least one additional latex that may or may not contain a urethane linkage.

Further, it is contemplated that a urethane linkage-containing latex may be produced using a multi-stage emulsion polymerization process. The multi-stage process may include an emulsion polymerization step wherein urethane linkages are formed during the emulsion polymerization process, as described herein. The multi-stage process may also include additional polymerization steps wherein urethane linkages are not formed during the emulsion polymerization process.

In conventional processes wherein a urethane linkage-containing latex is produced, such as that disclosed in U.S. Pat. No. 6,153,690, isocyanate is introduced to the process after the latex has already been formed by emulsion polymerization. In other words, the latex is formed prior to a urethane linkage being formed with the monomer constituents. Thus, the emulsion polymerization step takes place separately from the urethane linkage forming step. In contrast, in the presently described novel process, the emulsion polymerization and urethane linkage forming steps take place simultaneously. In U.S. Pat. No. 6,153,690, the isocyanate is introduced into a highly viscous emulsion that comprises isocyanate reactive polymer particles suspended in an aqueous medium. In the method described herein, isocyanate is introduced to the process during latex formation, that is, during emulsion polymerization of the monomer mixture. It is believed that the urethane linkage between the isocyanate and the isocyanate reactive monomer is formed based on infra-red spectroscopy, increased gel content and hardness of the resulting film.

The method described herein has advantages over conventional processes for producing a urethane linkage-containing latex (such as that disclosed in U.S. Pat. No. 6,153,690). Additionally, the urethane linkage containing latex produced by the described method has advantageous properties in comparison to a urethane linkage-containing latex produced by known methods.

For example, the currently described method has a much shorter processing time than known methods. Thus, the currently described method is more efficient and economical. More particularly, in the currently described method, the urethane linkage is formed during the emulsion polymerization process. Thus, the final, urethane-linkage containing, product can be produced during a single processing step that includes emulsion polymerization and urethane linkage formation. In contrast, in known methods, the first step includes emulsion polymerization wherein a latex containing an isocyanate reactive monomer is formed, then an isocyanate is introduced to the previously formed latex to form a urethane linkage. Thus, the polymerization step is separate from the urethane linkage forming step, and the entire process to produce a urethane linkage-containing latex is significantly longer. For example, in exemplary processes of this invention, the latex processing (or polymerizing) step typically takes around about six to eight hours, and the urethane linkage forming step typically takes around about six to eight hours. As one of ordinary skill in the art would understand, the latex processing step may take from about 1 hour to about 12 hours (or longer), and the urethane linkage forming step may take from about 2 hours to about 12 hours (or longer). Thus, for the novel processes described herein, the final product can be ready in about six to eight hours. Additionally, using the process described herein, the final product may be ready in about two to ten hours. In contrast, using previously known methods, the time to produce the final product can be approximately twice as long (or longer) because the polymerization step and the urethane linkage forming step are performed separately. Thus, it can take between approximately 12 and 16 hours to produce a urethane linkage-containing latex using conventional methods.

Additionally, the currently described method produces less coagulum than known methods for producing a urethane linkage-containing latex. For example, the described process may produce less than about 2 weight % coagulum based on total weight of polymer solids measured by weighing the undispersed polymer in water after drying at 110° C. for 1 hour, more preferably less than about 1 weight % coagulum, and most preferably less than about 0.8% coagulum. For example, the described method may produce less than about 2%, 1.8%, 1.6%, 1.4%, 1.2%, 1%, 0.9%, 0.8%, 0.7%, 0.6%, 0.5%, 0.4%, 0.3%, 0.2%, and 0.1% coagulum. The currently described process is cleaner, has less unusable byproduct, and thus is more economical.

The conventional method that introduces isocyanate into previously formed latex often leads to complete solidification of the emulsion. In this situation, the entire product is coagulum that is unusable.

In an exemplary embodiment, a urethane linkage-containing latex may be produced according to the following steps. FIG. 1 provides a schematic representation of this exemplary process. A monomer mixture comprising an isocyanate reactive monomer and at least one additional monomer can be combined with a diisocyanate, water, and a surfactant and emulsified under agitation to produce a monomer pre-emulsion. An exemplary monomer mixture may include butyl acrylate, methyl methacrylate, hydroxyethyl acrylate, and methacrylic acid. An exemplary diisocyanate may include bis(4-isocyanotocyclohexyl) methane diisocyanate. An exemplary surfactant may include polyoxyethylene tridecyl ether phosphate, ammonium salt or Rhodafac RS-610/A25®. The monomer pre-emulsion and a catalyst or initiator can be introduced to a reactor for polymerization. The catalyst may include t-butyl hydroperoxide and sodium metabisulfite. The reactor may also contain seed latex, water, and an ammonium solution (for example, ammonium hydroxide solution). The catalyst may include an oxidizer and a reducer. The various components may be introduced to the reactor over a period of time. For example, the monomer pre-emulsion may be added over a period of from about 30 minutes to about 400 minutes, more preferably from a period of about 100 minutes to about 300 minutes, and most preferably from a period of about 150 minutes to about 250 minutes. In a further example, the catalyst may be added over a period of from about 30 minutes to about 400 minutes, more preferably from a period of about 100 minutes to about 300 minutes, and most preferably from a period of about 150 minutes to about 250 minutes. As one of ordinary skill in the art will appreciate, the amount of water in the reactor is variable. For example, the amount of water in the reactor may be from about 30% to about 80%, more preferably from about 40% to about 60%, most preferably from about 45% to about 55%. While components are being introduced to the reactor, the temperature may be held at a constant temperature. For example, the temperature may be between about 45° C. and about 90° C., more preferably between about 55° C. and 85° C., and most preferably between about 60° C. and 75° C. After the components have been added to the reactor, the temperature may be increased. For example, the temperature may be increased by 5 to 50 degrees, more preferably, by 10 to 30 degrees, and most preferably by 10 to 20 degrees relative to the temperature of the reactor during the time period when the components are being added. During the higher temperature period, further additional components such as, for example, oxidizer and reducer or other initiators may be added. Emulsion polymerization takes place in the reactor during the period when the components are combined in the reactor. The emulsion polymerization time period varies. It may occur over a period of one hour to 10 hours, more preferably 2 hours to 8 hours, and most preferably 3 hours to 6 hours. The time period for polymerization is affected by temperature, monomer composition, and initiator, as these variables determine the rate of polymerization.

The formed latex or emulsion will have quantifiable characteristics such as, for example, solids content, pH value, viscosity, and amount of coagulum. Exemplary characteristic values may include a solids content of between about 40% and 65%, preferably between 45% and 60%, more preferably between 50% and 55%; a pH value of between about 4.5 and 10.5, preferably between 5.5 and 9.5, more preferably between 6.0 and 9.0; a viscosity of between about 100 and 3000 centipoise, preferably between 100 cps and 2000 cps, more preferably between 100 cps and 1000 cps; and a coagulum amount of between about 0.5% and 3%, preferably between 0.3% and 2%, more preferably between 0.2% and 1%.

In another exemplary embodiment, the above-described process may be altered by adding the diisocyanate to the reactor directly rather than combining it with the monomer mixture prior to adding it to the reactor. Additionally, the surfactant may be added to the reactor directly rather than combining it with the monomer mixture prior to adding it to the reactor. Further, surfactant may be introduced to the process at multiple times and locations. For example, surfactant may be added to the monomer mixture for inclusion in the monomer pre-emulsion and also added directly to the reactor.

Figure 2:
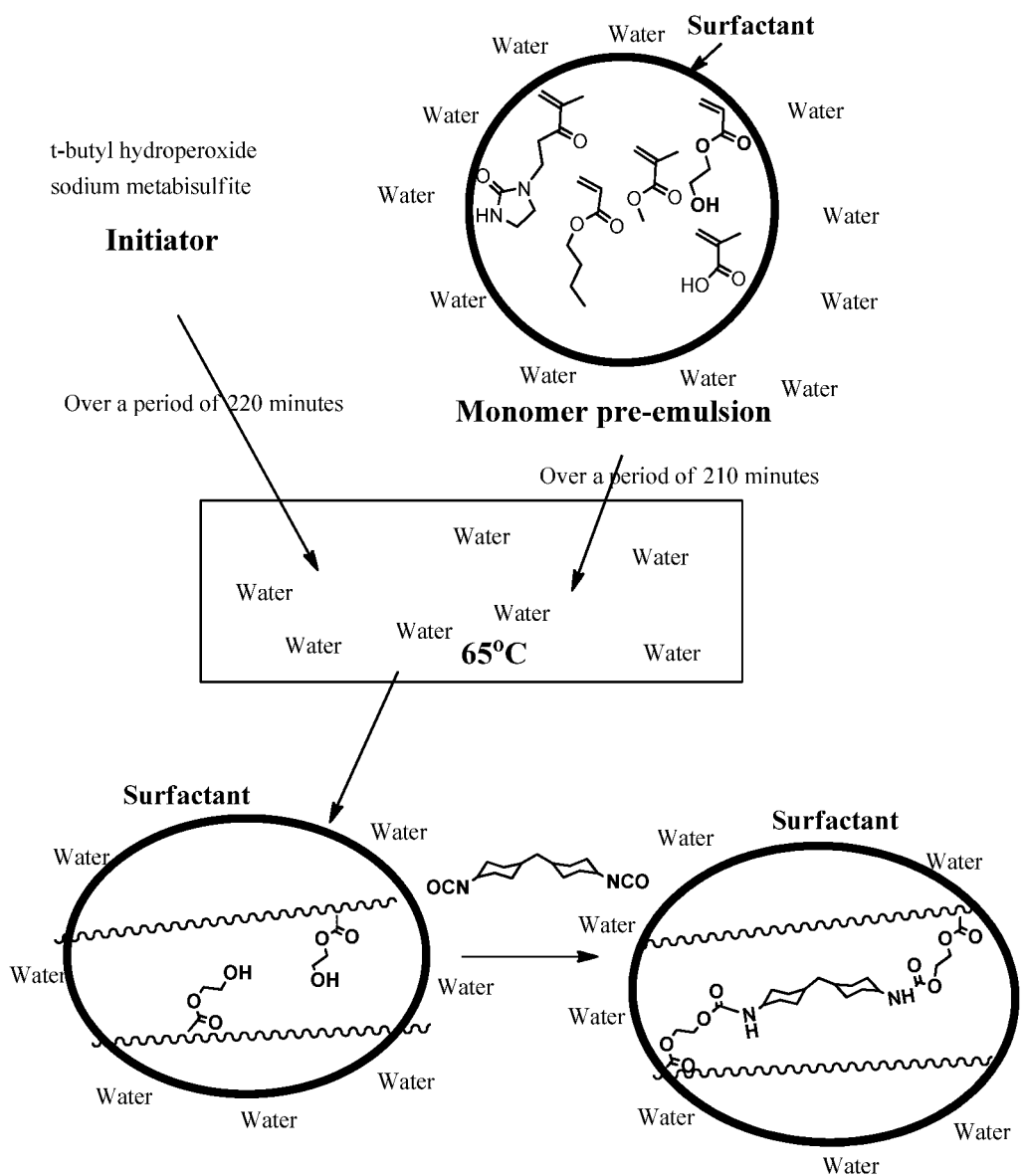
FIG. 2 is a schematic representation of a prior art process for making a urethane linkage containing latex.

An exemplary prior art process is illustrated in FIG. 2. FIG. 2 provides a schematic representation of the process described in U.S. Pat. No. 6,153,690. In FIG. 2, an organic monomer mixture comprising an isocyanate reactive monomer is added along with an initiator, water, and a surfactant to a reactor. The reactor is heated to about 85° C. for a period of time, and the monomer mixture is polymerized to form an isocyanate-reactive latex. After the latex has been formed, the latex, additional water, and a diisocyanate are combined and maintained at room temperature or elevated temperatures for several hours with agitation. A urethane linkage containing latex is produced as a result.

The currently described process is illustrated in the following non-limiting examples.

EXAMPLES

The latexes produced in Examples 1 and 2 provide a comparison between urethane linkage-containing latex produced using the currently described method wherein the formation of urethane linkages and emulsion polymerization takes place during the same processing step/stage and urethane linkage-containing latex produced using a conventional method wherein urethane linkage formation and polymerization take place as two separate steps/stages.

Example 1. A Method of Making a Urethane Linkage-Containing Latex According to the Invention in which Diisocyanate is Added During the Polymerization 16.5 g seed latex and 490 g of water was added to a three-liter, jacketed glass reactor equipped with dual impellers, reflux condensers, and stainless steel feed lines. The reactor was then heated to 65° C. In a separate vessel, monomers including 544 g butyl acrylate, 447 g methyl methacrylate, 56.5 g hydroxyethyl acrylate, 22.1 g Norsocryl 104®, and 8.1 g methacrylic acid were combined with 37 g of bis(4-isocyanotocyclohexyl) methane diisocyanate, 228 g water and 77.4 g Rhodafac RS-610/A25® and emulsified under agitation to form a monomer pre-emulsion. Commencing simultaneously, monomer pre-emulsion and ammonium hydroxide solution were fed to the reactor over 210 minutes, and oxidizer and reducer solutions were fed to the reactor over 220 minutes. The oxidizer and the initiator that were used to initiate polymerization were t-butyl hydroperoxide (t-BHP) solution and sodium metabisulfite (SMBS), respectively. During feeding of the initial components, the temperature was maintained at 65° C. After the end of the oxidizer and reducer feeds, the reactor temperature was increased to 75° C. and was held at the increased temperature for 30 minutes. Then, additional t-BHP and SMBS solutions were fed to reactor over a 60 minute period to reduce residual monomers. The formed emulsion had a solid content of 52.16%, a pH value of 6.62, and a viscosity of 480 centipoise.

Example 2. A Method of Making a Urethane Linkage-Containing Latex According to a Prior Art Process in which Diisocynate is Added into Latex The first stage of the process was to form an isocyanate reactive latex. 16.5 g seed latex and 500 g water were added to a three-liter, jacketed glass reactor equipped with dual impellers, reflux condensers, and stainless steel feed lines. The reactor was then heated to 65° C. Monomers including 544 g butyl acrylate, 447 g methyl methacrylate, 56.5 g hydroxyethyl acrylate, 22.1 g Norsocryl 104® and 8.1 g methacrylic acid were combined with 228 g water and 77.4 g Rhodafac RS-610/A25® and emulsified under agitation to form a monomer pre-emulsion. Commencing simultaneously, monomer pre-emulsion and ammonium hydroxide solution were fed to the reactor over 210 minutes and oxidizer and reducer solutions were fed to the reactor over 220 minutes. Polymerization was initiated using an oxidizer and a reducer. The oxidizer was a t-butyl hydroperoxide (t-BHP) solution, and the reducer was sodium metabisulfite (SMBS). The reactor temperature was maintained at 65° C. After the end of oxidizer and reducer feeds, the reactor temperature was increased and held at 75° C. for 30 minutes. Then, additional t-BHP and SMBS solutions were fed over a period of 60 minutes to reduce residual monomers. The formed emulsion had a solid content of 50.28%, a pH value of 6.04, and a viscosity of 920 centipoise.

The next stage was to add an isocyanate in order to form urethane linkages in the latex. 250 g of the isocyanate reactive latex (produced above) was added into a flask equipped with a nitrogen blanket. The temperature of the flask was raised to 60° C. 4 g of isophorone diisocyanate was added into the flask over a period of 200 minutes while maintaining the temperature at 60° C. The reaction was held for 2 hours after the addition of isophorone diisocyanate was completed. Then more water was added before cooling the flask to ambient temperature. The formed emulsion had a solid content of 45.6%, a pH value of 5.51, and a viscosity of 80 centipoise after removing coagulum.

Infrared spectroscopy (IR) was employed to confirm the formation of urethane linkages in the acrylic emulsions formed in Examples 1 and 2.

Figure 3:
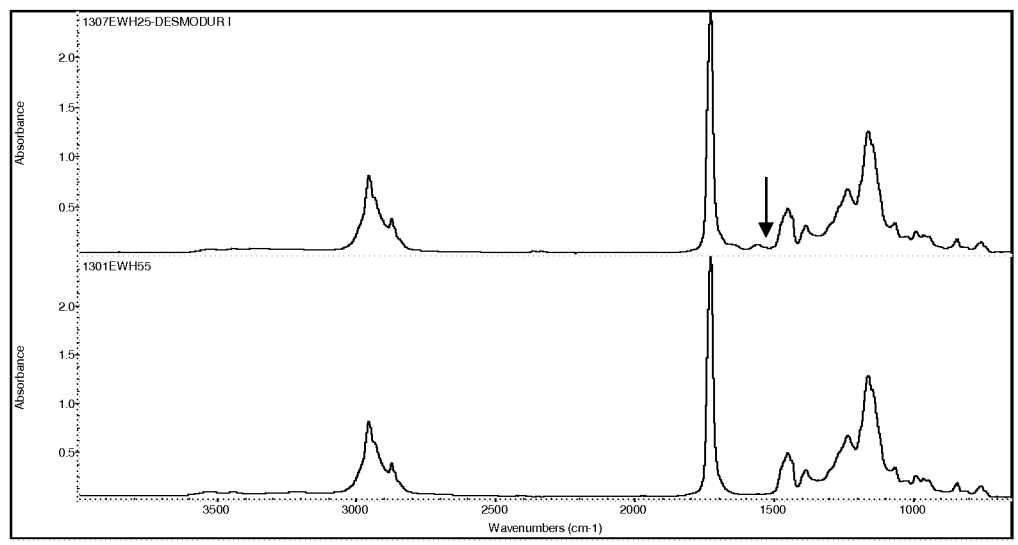
FIG. 3 is a graphical plot for Example 1 comparing the IR spectra of an acrylic emulsion without the addition of diisocyanate (bottom) and with (top) the addition of diisocyanate during emulsion polymerization. The arrow denotes the urethane linkage.

For Example 1, FIG. 3 provides a graphical representation comparing the IR spectra of the acrylic emulsion without (bottom spectrum) and with (top spectrum) the addition of diisocyanate during the emulsion polymerization. The acrylic emulsion used for the bottom spectrum was that made in Example 2 prior to the diisocyanate being added.

The IR spectrum of Example 1 shows the formation of urethane linkage at 1550 cm$^{-1}$.

Figure 4:
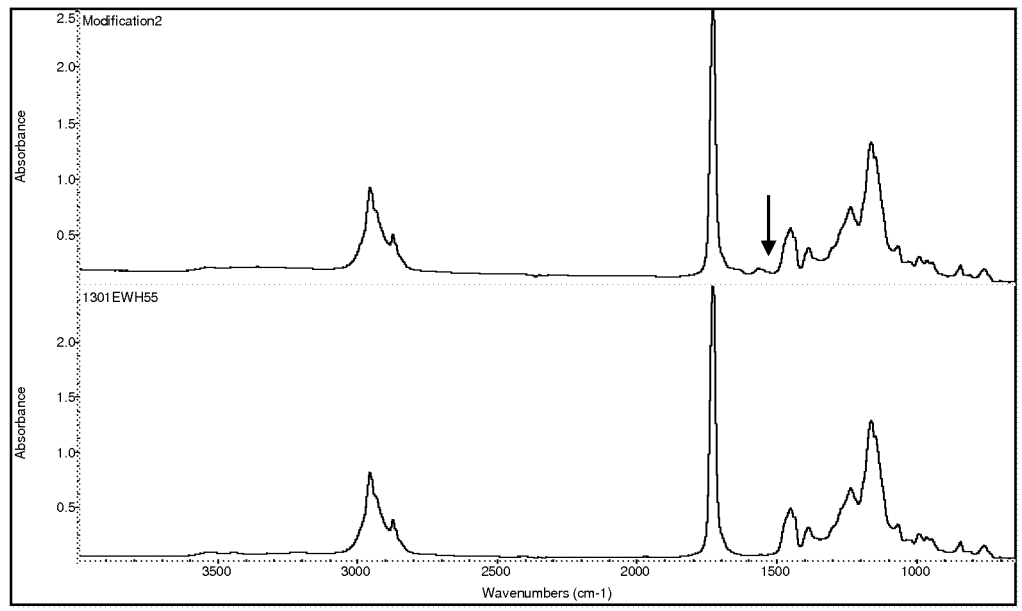
FIG. 4 is a graphical plot for Example 2 comparing the IR spectra of an acrylic emulsion before the addition of diisocyanate (bottom) and after (top) addition of diisocyanate to an acrylic emulsion. The arrow denotes the urethane linkage.

For Example 2, FIG. 4 provides a graphical representation comparing the IR spectra of the acrylic emulsion before (bottom spectrum) and after (top spectrum) the addition of diisocyanate to the acrylic emulsion.

In FIG. 4, a new peak at 1550 cm$^{-1}$, which corresponds to a urethane linkage, is formed upon the addition of diisocyanate to the hydroxy containing acrylic emulsion. In FIG. 3, the IR spectrum shows the formation of a urethane linkage at 1550 cm$^{-1}$, as shown in FIG. 4 for Example 2. Thus, both methods enable the formation of a urethane linkage containing latex.

Table 1 provides a listing of the physical properties of the acrylic emulsions formed in Examples 1 and 2.

As can be seen, hardness and glass transition temperature increase when a urethane linkage is introduced into an acrylic emulsion with the same monomer composition. Gel content, which represents the degree of crosslinking, also increases with the addition of diisocyanate. Gel content is measured by the following method.

Gel content is provided as a percentage of an insoluble fraction of the aqueous emulsion polymer divided by the total dry weight of the aqueous emulsion polymer. To determine gel content, a latex sample was allowed to dry to a dry polymer film. A 0.3 g sample of the dry polymer film was placed in a clean extraction basket. The basket with the dry polymer film was submersed in 100 mL tetrahydrofuran at room temperature for 48 hours. The basket was then placed in a fresh 100 mL tetrahydrofuran at room temperature for another 48 hours. The insoluble fraction of the polymer in the basket was dried at room temperature for 10 min and then at 100° C. for one hour. The gel content was calculated and is expressed as a percentage of an insoluble fraction of the aqueous emulsion polymer over the total dry weight of the aqueous emulsion polymer.

This finding demonstrates that the chemical resistance of a coating may be enhanced by forming a latex with a urethane linkage.

TABLE 1

| | Example 2 - prior to isocyanate | Example 2 | Example 1 |
|---|---|---|---|
| Diisocyanate introduction | No addition | Post-addition | In-situ addition |
| Isophorone Diisocyanate (% on emulsion solids) | 0 | 3.2 | 3.5 |
| Non-volatile solids (weight %) | 50.3 | 45.6 | 52.1 |
| Tg (° C.) | 9.63 | 12.79 | 12.30 |
| Koenig Hardness | 14 sec | 19 sec | 17 sec |

TABLE 1-continued

| | Example 2 - prior to isocyanate | Example 2 | Example 1 |
|---|---|---|---|
| (3 mil wet thickness) | 8 oscillations | 14 oscillations | 12 oscillations |
| Gel content (%) | 65.3 | 86.3 | 80.1 |
| Particle size (nm) | 188 | 149 | 160 |

As seen in Table 1, the urethane linkage containing latex of Example 1 has higher solids content than the urethane linkage containing latex of Example 2. Additionally, the latex of Example 1 also has improved gel content and hardness even with the higher solids content.

The latexes produced in Examples 3 and 4 provide an additional comparison between urethane linkage-containing latex produced using an exemplary method of the invention and urethane linkage-containing latex produced using a conventional method.

Example 3. A Method of Making a Urethane Linkage-Containing Latex According to the Invention in which Diisocyanate is Added During the Polymerization 16.5 g of a seed latex and 490 g water were added to a three-liter, jacketed glass reactor equipped with dual impellers, reflux condensers, and stainless steel feed lines. The reactor was then heated to 65° C. Monomers including 544 g butyl acrylate, 447 gram methyl methacrylate, 56.5 gram hydroxyethyl acrylate, 22.1 g Norsocryl 104®, and 8.1 g methacrylic acid were combined with 37 grams of bis(4-isocyanotocyclohexyl) methane diisocyanate, 228 g water and 77.4 g Rhodafac RS-610/A25® and emulsified under agitation to form a monomer pre-emulsion. Polymerization was initiated using t-butyl hydroperoxide (t-BHP) solution as oxidizer and sodium metabisulfite (SMBS) as reducer. Commencing simultaneously, monomer pre-emulsion and ammonium hydroxide solution were fed to the reactor over a period of 210 minutes, and oxidizer and reducer solutions were fed to the reactor over a period of 220 minutes. The temperature of the reactor was maintained at 65° C. After the oxidizer and reducer feeds were added, the reactor temperature was increase to 75° C. and held at this temperature for 30 minutes. Then, additional t-BHP and SMBS solutions were fed over a period of 60 minutes to reduce residual monomers. The formed emulsion had a solid content of 51.07%, a pH value of 6.09, a viscosity of 1180 centipoise, and 2.56 grams of coagulum (0.223% coagulum).

Example 4. A Method of Making a Urethane Linkage-Containing Latex According to a Prior Art Process in which Diisocynate is Added into Latex Varying amounts of water were used in this example to evaluate whether a urethane linkage-containing latex with a high solids content and a low viscosity could be obtained using the conventional process.

In a first stage, a latex containing an isocyanate reactive monomer was formed. 16.5 g of a seed latex and 500 g water were added to a three-liter, jacketed glass reactor equipped with dual impellers, reflux condensers, and stainless steel feed lines. The reactor was then heated to 65° C. Monomers including 544 g butyl acrylate, 447 g methyl methacrylate, 56.5 g hydroxyethyl acrylate, 22.1 g Norsocryl 104®, and 8.1 g methacrylic acid were combined with 228 g water and 77.4 g Rhodafac RS-610/A25® and emulsified under agitation to form a monomer pre-emulsion. Polymerization was initiated using t-butyl hydroperoxide (t-BHP) solution as oxidizer and sodium metabisulfite (SMBS) as reducer. Commencing simultaneously, monomer pre-emulsion and ammonium hydroxide solution were fed to the reactor over a period of 210 minutes, and oxidizer and reducer solutions were fed to the reactor over a period of 220 minutes. The temperature was maintained at 65° C. After the oxidizer and reducer feeds were added, the reactor temperature was increased to 75° C. and was held for 30 minutes. Then, additional t-BHP and SMBS solutions were fed over a period of 60 minutes to reduce residual monomers. The formed emulsion had a solid content of 50.24%, a pH value of 6.37, a viscosity of 900 centipoise, and 1.98 grams of coagulum.

In a second stage, three different latex samples containing a urethane linkage were formed. The same procedure, with the exception of the amount of water added, was used for each sample. The previously formed emulsion was added to a flask equipped with a nitrogen blanket, an agitator and various amounts of additional water. Three exemplary amounts of water were used—48.96%, 52.20%, and 56.10% relative to the total weight of the emulsion. The temperature was increased to 65° C. and 37 g of bis(4-isocyanotocyclohexyl) methane diisocyanate was added into the flask over a period of several hours with good agitation. Table 2 contains physical property data for each of the latex samples produced in Example 4 and for the latex produced in Example 3.

TABLE 2

| Reference # | Emulsion Solids | Viscosity | % Coagulum on polymer solids |
|---|---|---|---|
| Example 3 | 51.07 | 1180 centipoise | 0.223 |
| Example 4a | 51.04* | Solidify | 100 |
| Example 4b | 47.80* | Solidify | 100 |
| Example 4c | 43.90* | 320 centipoise | 5.56 |

(*theoretical solids)

The process of Example 3 successfully produced a high solids emulsion product with low viscosity and low level of coagulum. In contrast, as shown in Examples 4a and 4b, prior art processes fail to produce high solids emulsion products. Rather, they lead to solid material that is not dispersible in water. For example, Example 4a had a theoretical solids content of 51.04% but was not fluid and was unusable. Similarly, Example 4b had a theoretical solids content of 47.80% but was not fluid and was unusable. If enough water was added to the process prior to the addition of isocyanate, the resulting latex became more fluid. For example, enough water was added to the process of Example 4c prior to the addition of isocyanate, that the resulting latex was fluid and usable. However, the theoretical solids content was only 43.90%. Further, the coagulum produced in the process of Example 4c was significantly higher than the coagulum produced by the process of Example 3. Advantageously, the process of Example 3 also produced a urethane linkage-containing latex with higher solids and a usable viscosity.

As seen for Examples 4a and 4b, the post-addition of hydrophobic diisocyanate into the isocyanate reactive high solids emulsion led to complete solidification of the emulsion. As seen in Example 4c, upon reducing the emulsion viscosity by adding water, the addition of a hydrophobic diisocyanate into the emulsion results in a fluid emulsion; however, with relatively low solids content and a high level of coagulum.

As discussed above, the formation of coagulum is economically undesirable because the coagulum must be disposed of as waste and removing the coagulum from the processing equipment adds labor and processing time.

We claim:

1. A latex comprising polymer having a urethane linkage, wherein said urethane-containing latex is formed during a singe processing step that includes emulsion polymerization and urethane linkage formation in the presence of a surfactant or emulsifying agent by polymerizing isocyanate with a monomer mixture, said monomer mixture including at least one isocyanate reactive monomer (A) and at least one additional monomer (B), said monomers (A) and (B) selected from the group consisting of alkyl(meth)acrylate monomers, vinyl esters of linear or branched carboxyli acids, styrene or styrene derivatives, hydroxyl-substituted alkyl esters of (meth)acrylic acids, wet adhesion monomers, carbonyl containing monomers, ionic monomers, phosphorus containing monomers, sulfur containing monomers and a combination thereof, wherein the isocyanate and the monomer mixture are combined prior to polymerization and not after, and wherein the solids content of the latex is greater than or equal to 47%, the viscosity is less than 3000 centipoise, the particle size is less than or equal to 500 nm, and the coagulum content as measured by weighing undispersed polymer in water after drying at 110° C. for 1 hour is less than 2%.

2. The latex of claim 1, wherein the solids content of the latex is greater than or equal to 50%.

3. The latex of claim 1, wherein the solids content of the latex is between about 47% and about 65%.

4. The latex of claim 1, wherein the viscosity is less than 2500 centipoise.

5. The latex of claim 4, wherein the viscosity is less than or equal to 2000 centipoise.

6. The latex of claim 1, wherein the particle size is less than or equal to 400 nm.

7. The latex of claim 1, wherein the particle size is between about 50 and 500 nm.

8. The latex of claim 1, wherein the viscosity is less than 2500 centipoise and the particle size is less than or equal to 400 nm.

9. An emulsion polymerization method for producing a latex containing a urethane linkage comprising polymerizing by emulsion polymerization an isocyanate and a monomer mixture comprising no polymers, said monomers including an isocyanate reactive monomer and at least one additional monomer, to produce the latex, wherein the monomer mixture and the isocyanate are combined prior to polymerization and not after, emulsion polymerization and urethane linkage formation occurring substantially simultaneously during a single processing step.

10. The method of claim 9, wherein polymerization takes place in a reactor and the method further comprises introducing a catalyst to the reactor.

11. The method of claim 10, wherein the catalyst is selected from the group consisting of an oxidizer and a reducer.

12. The method of claim 10, further comprising introducing an amine to the reactor.

13. The method of claim 9, further comprising adding water and a surfactant to the monomer mixture.

14. The method of claim 9, wherein the isocyanate comprises a multi-functional isocyanate.

15. The method of claim 14, wherein the isocyanate is selected from the group consisting of di-cyclohexylmethane-4,4'-diisocyanate, α,α-dimethyl meta isopropenyl benzyl isocyanate, isophorone diisocyanate, xylene diisocyanate, cyclohexane diisocyanate, hexamethylene diisocyanate, and oligomeric hexamethylene diisocyanate.

16. The method of claim 9, wherein the isocyanate reactive monomer and/or the at least one additional monomer comprise(s) one or more of an alkyl (meth) acrylate monomer, vinyl monomer, styrene, alkyl substituted styrene, a mono ethylenically unsatured carboxylic acid monomer, phosphorous containing monomer, or sulfur containing monomer.

17. The method of claim 16, wherein the isocyanate reactive monomer is selected from the group consisting of hydroxyl containing alkyl (meth) acrylate monomer, hydroxyl containing vinyl monomer, hydroxyl containing allyl monomer, acetoacetoxy containing alkyl (meth) acrylate, and acetoacetoxy containing allyl monomer.

* * * * *